United States Patent [19]

Cohrs

[11] 4,102,189
[45] Jul. 25, 1978

[54] TURBINE FLOWMETER WITH OVERSPEED PROTECTION

[75] Inventor: Gary D. Cohrs, Tempe, Ariz.

[73] Assignee: Flow Technology, Inc., Phoenix, Ariz.

[21] Appl. No.: 807,989

[22] Filed: Jun. 20, 1977

[51] Int. Cl.² .................. G01F 1/115; G01F 1/12
[52] U.S. Cl. ................................ 73/230; 73/231 R
[58] Field of Search ............. 73/231 R, 187, 194 R, 73/197, 230

[56] References Cited

U.S. PATENT DOCUMENTS 1,593,291  7/1926  Critchlow .................. 73/231 R X
3,771,363  11/1973  Stapler .................... 73/231 R

*Primary Examiner*—James J. Gill
*Attorney, Agent, or Firm*—Christie, Parker & Hale

[57] ABSTRACT

A turbine wheel is mounted for rotation in a cylindrical housing at the end of rod, the housing and rod pass through a sleeve to insert the turbine wheel in a line to intercept fluid flowing therethrough. The rotational position of the rod is controlled as it passes through the sleeve to align the turbine wheel with the direction of flow through the line. A pickoff coil senses the rotation of the turbine wheel. Responsive to the pickoff coil, the sleeve and the rod are rotated as a unit to reduce the fluid intercepted by the turbine wheel.

8 Claims, 6 Drawing Figures

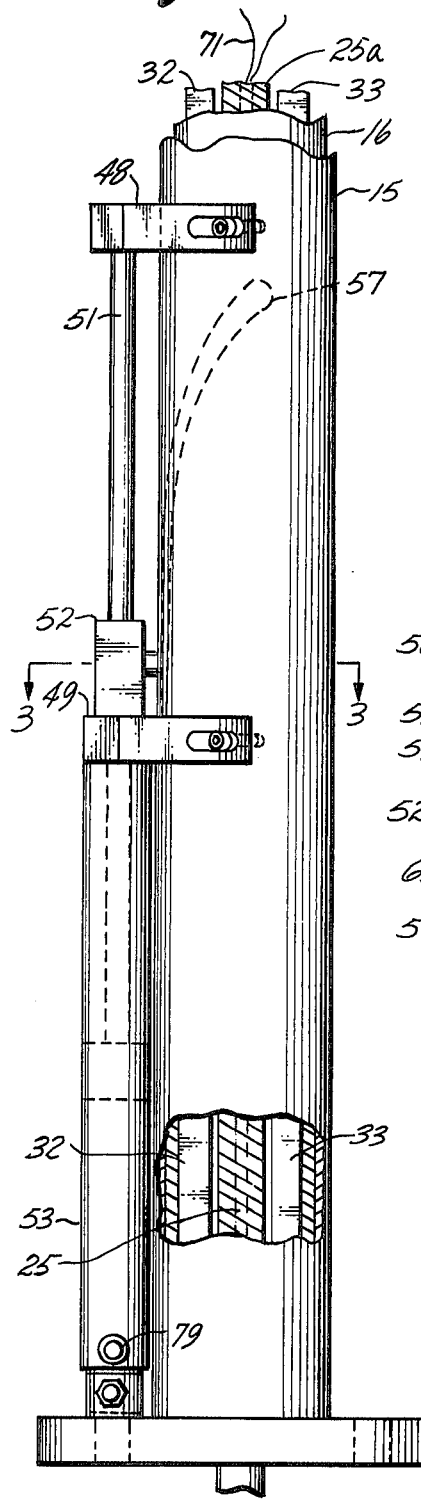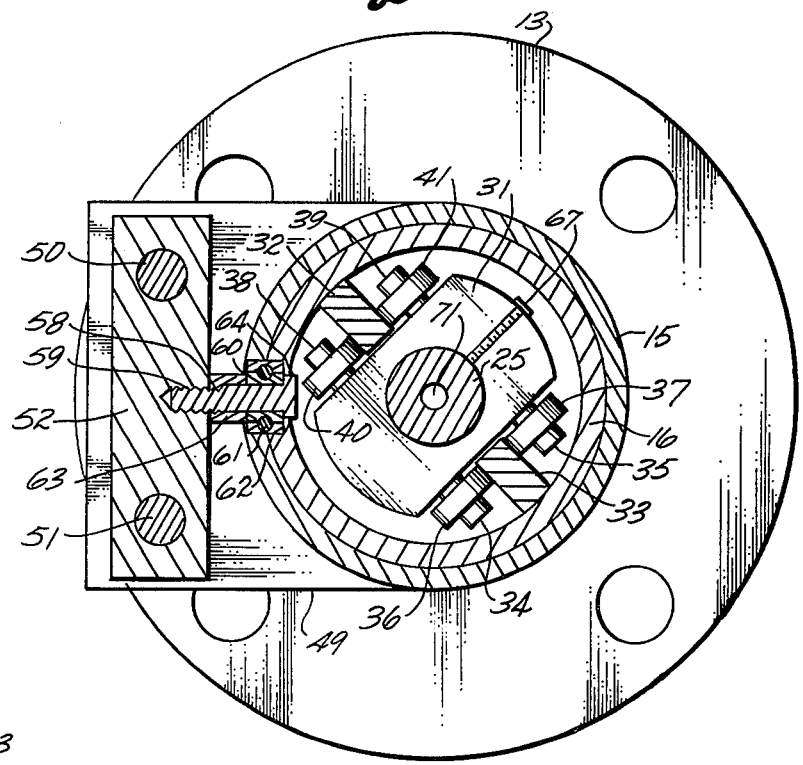

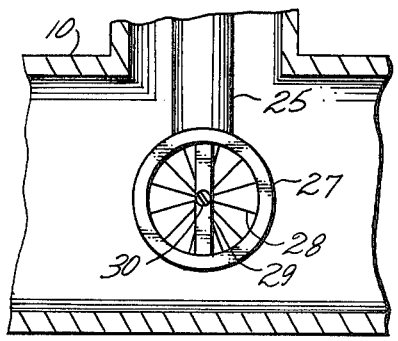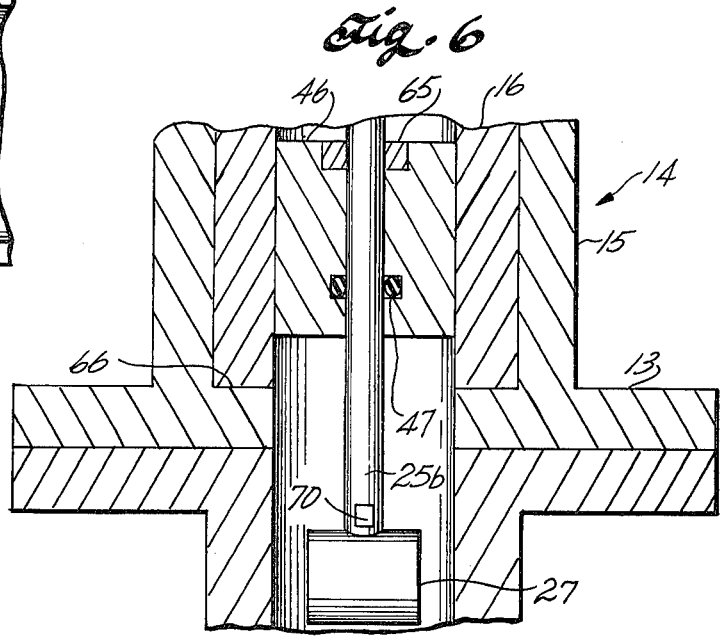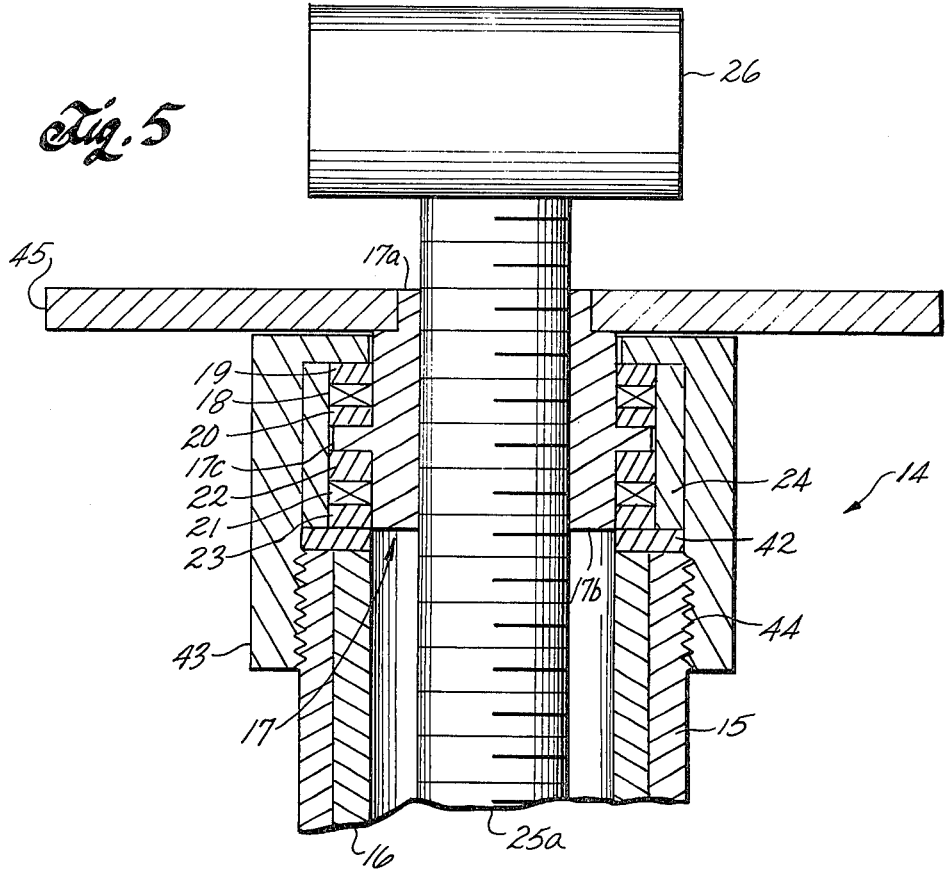

TURBINE FLOWMETER WITH OVERSPEED PROTECTION

BACKGROUND OF THE INVENTION

This invention relates to turbine flowmeters and, more particularly, to overspeed protection for a self-aligning probe-type flowmeter.

A turbine flowmeter has a rotatable turbine wheel positioned to intercept fluid flowing through a line. The turbine wheel rotates at a speed proportional to the fluid velocity. The rotation of the turbine wheel is sensed by a pickup coil, which provides pulses to actuate an indicator.

One class of turbine flowmeter is designed for insertion in a fluid flow line as a probe. The turbine wheel is located in a cylindrical housing suspended in the flow line from a support rod. Such a probe-type flowmeter is generally designed to disturb fluid flow as little as possible. As a result, the turbine wheel is small and is usually supported for rotation by fragile ball bearings. Rotation of the turbine wheel at a speed above that for which the flowmeter is designed may damage the fragile ball bearings.

In a prior art self-aligning, probe-type turbine flowmeter, the support rod rides on an axially extending rail as it passes through the probe casing during insertion of the turbine wheel into a fluid line. The rail controls the rotational position of the turbine wheel as it passes through the casing to insure alignment of turbine wheel with the direction of flow through the line.

An application of James F. Guthrie, entitled IMPROVED TURBINE FLOWMETER, Ser. No. 800,562, filed May 25, 1977, and an application of James F. Guthrie and Richard E. Zimmerman, entitled IMPROVED TURBINE FLOWMETER, Ser. No. 800,557, filed May 25, 1977, both assigned to the assignee of the present application, disclose arrangements for providing overspeed protection for the fragile ball bearings of a turbine flowmeter. These arrangements are not applicable to a self-aligning, probe-type turbine flowmeter wherein the rotational position of the rod supporting the turbine wheel is controlled by an axially extending rail.

SUMMARY OF THE INVENTION

According to the invention, a self-aligning, probe-type turbine flowmeter has a rotatable sleeve through which the support for the turbine wheel, including rod and housing, passes as the turbine wheel is inserted into a line to intercept fluid flowing therethrough. The rotational position of the turbine wheel support is controlled as it passes through the sleeve to provide self alignment of the turbine wheel with the direction of flow. The rotation of the turbine wheel about its axis responsive to fluid flow is sensed. When the sensed rotation of the turbine wheel exceeds a predetermined safe speed limit, the sleeve and the turbine wheel support are rotated as a unit out of alignment with the direction of flow to reduce the fluid intercepted by the turbine wheel.

In the preferred embodiment of the invention, the sleeve lies within the stationary flowmeter casing where it is rotatably movable and axially fixed. A straight axial slot is formed in the casing, and a helical slot is formed in the sleeve. An axially translatable roller bearing rides in the slots to turn the sleeve and the turbine wheel support as a unit.

BRIEF DESCRIPTION OF THE DRAWINGS

The features of a specific embodiment of the best mode contemplated of carrying out the invention are illustrated in the drawings, in which:

FIG. 2 is a front view of the flowmeter of FIG. 1 showing the middle of the flowmeter in section;

FIG. 3 is a top sectional view of the flowmeter of FIG. 1 taken through section 3—3;

FIG. 4 is a side sectional view of the flow line of FIG. 1 illustrating the turbine wheel support after rotation;

FIG. 5 is a side sectional view of the top of the flowmeter of FIG. 1; and

FIG. 6 is a side sectional view of the bottom of the flowmeter of FIG. 1.

DETAILED DESCRIPTION OF THE SPECIFIC EMBODIMENT

Figure 1:
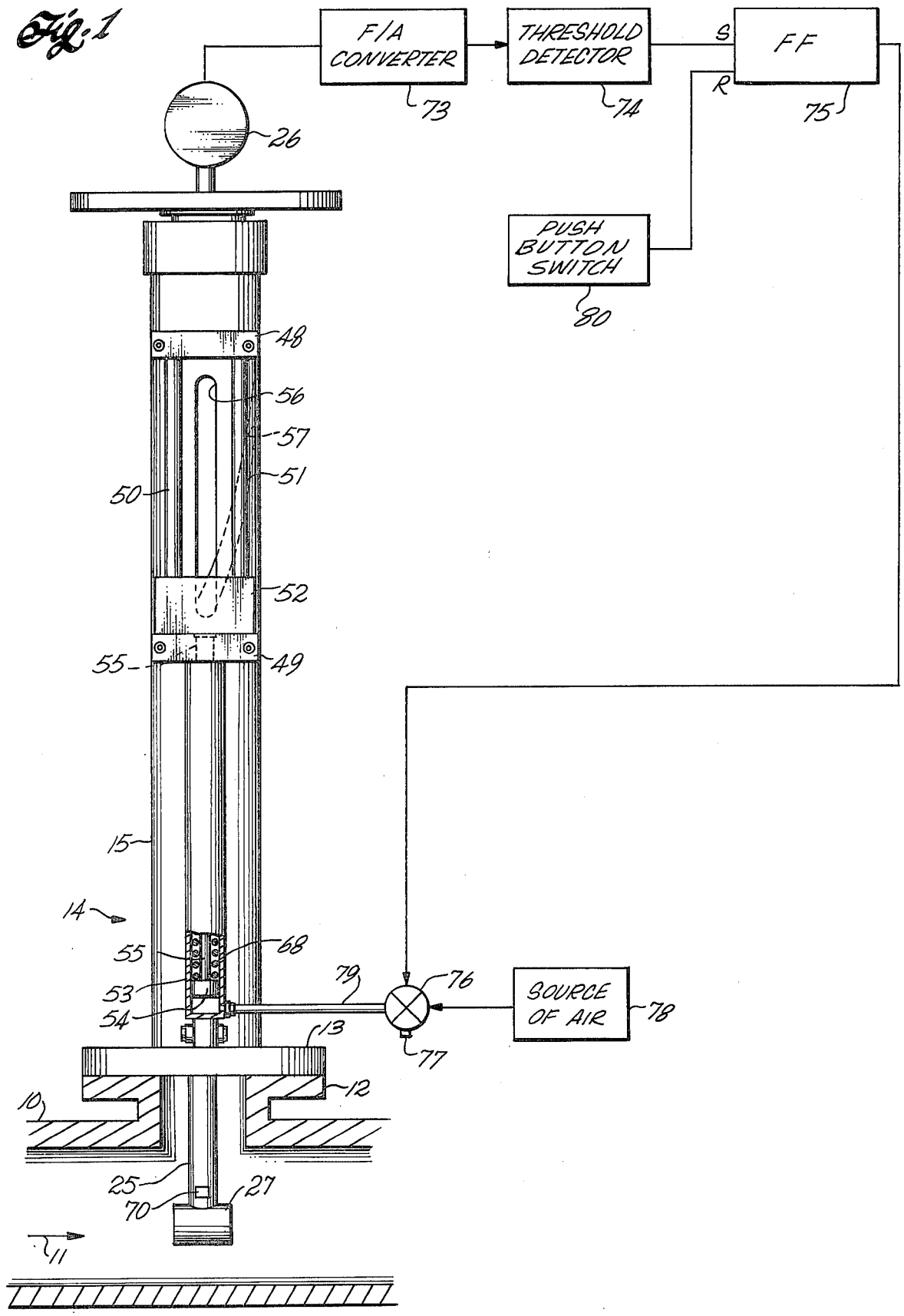
FIG. 1 is a side elevation view of a probe-type turbine flowmeter incorporating the principles of the invention installed in a fluid line.

In FIG. 1, fluid flows through a line 10 in the direction of an arrow 11. Line 10 has a mounting flange 12 to which a mounting flange 13 of a flowmeter 14 is secured by fasteners not shown. One end of a casing 15 for flowmeter 14 is integral with mounting flange 13. As shown in FIG. 2, a sleeve 16 fits snugly within casing 15. Sleeve 16 is free to rotate within casing is, but is held axially fixed by means described below in connection with FIGS. 5 and 6. Sleeve 16 is the same length as casing 15. A support rod 25 extends through sleeve 16 of flowmeter 14 from a point outside line 10 to a point inside line 10. A cylindrical housing 26 is mounted on the end of rod 25 outside line 10. A cylindrical housing 27 is integral with the end of rod 25 inside line 10. A collar 31, (FIG. 3) which fits snugly around rod 25, is affixed to rod 25 intermediate of its ends by set screws 67. Above collar 31 rod 25 has a threaded portion 25a and below collar 31 rod 25 has an unthreaded portion 25b.

As shown in FIG. 4, a turbine wheel 28 is disposed in housing 27. Supporting bars 29 are fixed inside housing 27 on both sides of turbine wheel 28. Turbine wheel 28 has a shaft, not shown, which is journaled for rotation in supporting bars 29 by fragile ball bearings 30.

As shown in FIG. 5, at the top of flowmeter 14, threaded portion 25a passes through the threaded bore of a nut 17. Nut 17 has a portion 17a with a hexagonal perimeter, a portion 17b with a cylinderical perimeter, and an outwardly extending annular flange portion 17c intermediate of the ends of cylindrical portion 17b. On one side of flange 17c a roller bearing 18 sandwiched between thrust washers 19 and 20 surrounds cylindrical portion 17b. On the other side of flange 17c a roller bearing 21 sandwiched between thrust washers 22 and 23 surrounds portion 17b. A spacer 24 surrounds flange 17c and the thrust bearing assembly comprising roller bearings 18 and 21, and washers 19, 20, 22, and 23. A washer 42 lies between the ends of sleeve 16 and casing 15 and the end of spacer 24. An end cap 43 has a threaded connection 44 with the top of casing 15. Nut 17 can rotate, but is not permitted to move axially, i.e. up and down. The end of cylindrical portion 17b and hexagonal portion 17a pass through an opening at the top of end cap 43. A hand wheel 45 has a hexagonal center opening into which hexagonal portion 17a fits snugly. As hand wheel 45 is turned, it rotates nut 17 and drives rod 25 in an axial direction, i.e. up or down. As rod 25 is driven down, roller bearing 18 takes up the thrust exerted on nut 17. End cap 43 retains the described components in place. Spacer 24 maintains sufficient space for the thrust bearing assembly between end cap 43 and washer 42 as end cap 43 is threaded onto the top of casing 15. As rod 25 is pulled up, roller bearing 21 takes up the thrust exerted on nut 17.

As shown in FIG. 6, at the bottom of flowmeter 14, a plug 46 is secured to sleeve 16. Rod 25 extends through a passage in plug 46 with a loose fit. An O-ring 47 is retained in a groove near the bottom of plug 46 to prevent leakage of fluid between plug 46 and rod 25 into casing 15 from line 10. An annular insert 65 made of a low friction material such as RULON is fixed in a groove at the top of plug 46. Insert 65 fits snugly around rod 25. Axial alignment between rod 25 and casing 15 is maintained by nut 17 and plug 46, including insert 65. The bottom of casing 15 has an annular shoulder 66 against which the bottom of sleeve 16 abuts to serve with washer 42 (FIG. 5) to hold sleeve 16 axially fixed relative to casing 15.

Rails 32 and 33 are attached by fasteners not shown to the interior surface of sleeve 16 at diametrically opposite positions. Rails 32 and 33 extend axially for the length of sleeve 16. Collar 31 has a flat face to which axles 34 and 35 are attached as, for example, by threaded connections. Rollers 36 and 37 are mounted for rotation on axles 34 and 35, respectively, in abutment with opposite sides of rail 33. Similarly, collar 31 has a flat face to which axles 38 and 39 are attached as, for example, by threaded connections. Rollers 40 and 41 are mounted for rotation on axles 38 and 39, respectively, in abutment with opposite sides of rail 32. There is a small clearance between the ends of rails 32 and 33 and the flat faces of collar 31. When rod 25 is inserted into or retracted from line 10 through sleeve 16, its rotation is prevented, and its rotational position is precisely controlled by the location of rails 33 and 34 because rollers 36 and 37 ride on rail 33 and rollers 40 and 41 ride on rail 32. Thus, turbine wheel 28 is precisely aligned with the direction of flow through line 10, when inserted therein.

Brackets 48 and 49 are secured by fasteners to the outer surface of casing 15 at axially spaced apart positions. Brackets 48 and 49 hold cylindrical guides 50 and 51, which extend axially along casing 15. A block 52 has openings through which guides 50 and 51 pass with a close fit. An air cylinder 53 is mounted between flange 13 and bracket 49. Air cylinder 53 has a movable piston 54 with a sealing ring around its middle. One end of arm 55 is attached to piston 54. Piston 54 is biased by a spring 68 to the bottom of cylinder 53. Arm 55 extends outside air cylinder 53 where its other end is attached to block 52. A straight axial slot 56 is formed in casing 15, and a helical slot 57 is formed in sleeve 16. Helical slot 57 extends around precisely 90° of the perimeter of sleeve 16 and is the same axial length as or slightly shorter than slot 56. A bolt 58 has a threaded connection 59 with the side of block 52 facing slots 56 and 57. An inner race 60, balls 61, and an outer race 62 enclosing balls 61 comprise a ball bearing assembly that lies between a sleeve 63 around the shank of bolt 58 and a head 64 on bolt 58. Bolt 58 is threaded into block 52 until inner race 60 is secured between head 64 and sleeve 63, leaving outer race 61 and balls 62 to rotate. Outer race 61 lies within both of slots 56 and 57. As arm 55 drives block 52 toward or away from line 10, outer race 61 rotatably rides through slots 56 and 57, which rotates sleeve 16 by virtue of the helical form of slot 57.

A pickup coil designated schematically at 70 in FIG. 1 is disposed in close proximity to turbine wheel 28. Each time a blade of turbine wheel 28 passes pickup coil 70, a pulse is generated by pickup coil 70. The pulses are transmitted by wires 71 passing through rod 25 to pulse shaping circuitry in housing 26. The shaped pulses are applied to a frequency-to-analog (F/A) converter 73 which produces an analog signal proportional to the frequency of such pulses. The output of frequency-to-analog converter 73 is connected to a threshold detector 74. When the amplitude of the analog signal exceeds a predetermined value representative of a safe limit on the rotational speed for turbine wheel 28, threshold detector 74 produces a trigger pulse which is applied to the S input of a flip-flop 75. The output of flip-flop 75 is applied as a control signal to a solenoid valve 76 having an exhaust port 77. A source of compressed air 78 is coupled to the inlet of valve 75 and a hose 79 is coupled to the outlet of valve 76. Normally, the output of flip-flop 75 is not energized, and hose 79 is connected to exhaust port 77. When threshold detector 74 produces a trigger pulse, flip-flop 75 is set, its output is energized, and valve 76 connects source of air 78 to hose 79, thereby extending arm 55 of air cylinder 53. A pushbutton switch 80 is connected to the reset input of flip-flop 75. When the pushbutton is closed, the switch produces a trigger pulse that resets flip-flop 75 and deenergizes its output. Thus, once the safe speed limit is exceeded, turbine wheel 28 is not returned to its operative position until pushbutton switch 80 is actuated.

To summarize, turbine wheel 28 is normally located in line 10 with its axis of rotation aligned with, i.e. parallel to the direction of fluid flow through line 10 and outer race 61 abuts the end of slot 57 nearer to line 10, as depicted in FIG. 1. In this position, turbine wheel 28 intercepts the fluid flowing through line 10 and rotates responsive to the intercepted fluid at a speed proportional to the fluid velocity. When the safe speed limit of turbine wheel 28 is exceeded, outer race 61 moves away from line 10 until it abuts the end of slot 57 farther from line 10 as air cylinder 53 drives block 52; sleeve 16 and rod 25 are thus turned as a unit 90° to the direction of fluid flow, i.e., so the axis of rotation of turbine wheel 28 is perpendicular to the direction of fluid flow. In this position, depicted in FIG. 4, turbine wheel 28 intercepts no or negligible fluid flowing through line 10 and is thus protected from damage to ball bearings 30. Turbine wheel 28 remains in this position until the reset button is pushed.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention, as set forth in the following claims. For example, means other than those disclosed could be employed to control the rotational position of rod 25 and housing 28 during insertion and removal.

What is claimed is:

1. A turbine flowmeter comprising:
   a turbine wheel;
   means for supporting the turbine wheel for rotation;
   a sleeve through which the supporting means passes for inserting the turbine wheel in a line to intercept fluid flowing therethrough and to rotate responsive to the intercepted fluid;

means for controlling the rotational position of the supporting means as it passes through the sleeve to align the turbine wheel with the direction of flow through the line;

means for sensing the rotation of the turbine wheel; and means responsive to the sensing means for rotating the sleeve and the supporting means as a unit to reduce the fluid intercepted by the turbine wheel.

2. The turbine flowmeter of claim 1, in which the supporting means comprises a rod extending axially through the sleeve and a cylindrical housing on the end of the rod in which the turbine wheel is located, and the controlling means comprises an axially extending rail attached to the interior of the sleeve, a pair of rotatable rollers abutting opposite sides of the rail, and means for connecting the rollers to the rod.

3. The turbine flowmeter of claim 1, in which the supporting means comprises a rod extending axially through the sleeve and a cylindrical housing on the end of the rod in which the turbine wheel is located, and the controlling means comprises a pair of axially extending rails attached to the interior of the sleeve at diametrically opposite positions, a pair of rollers abutting opposite surfaces of each rail, and means for connecting the rollers to the rod.

4. The turbine flowmeter of claim 3, in which the connecting means comprises a collar fitting closely around the rod and means for securing the collar to the rod, the collar having a pair of flat faces closely spaced from the ends of the respective rails, the rollers being connected to the flat faces of the collar.

5. The flowmeter of claim 4, additionally comprising a casing closely spaced around the sleeve to permit rotation of the sleeve, and means for holding the sleeve axially fixed, the rotating means comprising an axial slot formed in the casing, a helical slot formed in the sleeve, and an axially movable member engaging both slots to rotate the sleeve as the member moves axially.

6. The turbine flowmeter of claim 5, in which the member is a roller.

7. The flowmeter of claim 1 additionally comprising a casing closely spaced around the sleeve to permit rotation of the sleeve, and means for holding the sleeve axially fixed, the rotating means comprising an axial slot formed in the casing, a helical slot formed in the sleeve, and an axially movable member engaging both slots to rotate the sleeve as the member moves axially.

8. The turbine flowmeter of claim 7, in which the member is a roller.

* * * * *